(12) United States Patent
Liao et al.

(10) Patent No.: US 9,678,911 B2
(45) Date of Patent: Jun. 13, 2017

(54) SYSTEM FOR DISTRIBUTED COMPUTING AND STORAGE

(71) Applicant: Aupera Technologies, Inc., Burnaby (CA)

(72) Inventors: Yu Feng Liao, Surrey (CA); Zhengning Zhou, Shenzhen (CN)

(73) Assignee: Aupera Technologies, Inc., Burnaby, BC (CA)

( * ) Notice: Subject to any disclaimer, the term of this patent is extended or adjusted under 35 U.S.C. 154(b) by 20 days.

(21) Appl. No.: 14/939,908

(22) Filed: Nov. 12, 2015

(65) Prior Publication Data

US 2017/0139865 A1    May 18, 2017

(51) Int. Cl.
  *G06F 13/40* (2006.01)
  *G06F 13/42* (2006.01)

(52) U.S. Cl.
  CPC ...... *G06F 13/4022* (2013.01); *G06F 13/4221* (2013.01)

(58) Field of Classification Search
  CPC .................... G06F 13/4022; G06F 13/4221
  See application file for complete search history.

(56) References Cited

U.S. PATENT DOCUMENTS

| | | | |
|---|---|---|---|
| 7,633,799 B2 | 12/2009 | Gorobets | |
| 8,260,916 B2 * | 9/2012 | Frietsch | H04L 12/56 709/222 |
| 8,510,500 B2 | 8/2013 | Moon | |
| 8,533,550 B2 | 9/2013 | Khan | |
| 8,745,319 B2 | 6/2014 | Langlois | |
| 2002/0052960 A1* | 5/2002 | Trisno | H04B 10/2513 709/226 |
| 2008/0186202 A1* | 8/2008 | Vaswani | G01D 4/004 340/870.03 |
| 2010/0214959 A1* | 8/2010 | Kuehnel | H04L 29/12264 370/255 |
| 2011/0141512 A1* | 6/2011 | Coleman | G06K 15/00 358/1.15 |
| 2012/0017064 A1* | 1/2012 | Sasaki | H04L 67/1097 711/206 |
| 2013/0080687 A1 | 3/2013 | Nemazie | |
| 2015/0103826 A1* | 4/2015 | Davis | H04L 49/25 370/392 |
| 2015/0222592 A1* | 8/2015 | Andrews | H04L 61/2015 709/221 |

\* cited by examiner

*Primary Examiner* — Nimesh G Patel
(74) *Attorney, Agent, or Firm* — Timothy T. Wang; Ni, Wang & Massand, PLLC

(57) ABSTRACT

A distributed computing and storage system, comprising a switch fabric, an input/output interface connected to the switch fabric and a plurality of nodes connected to the switch fabric, each node of the plurality of nodes having a node physical address, each node of the plurality of nodes having a node communication address, which is assigned by the processor inside the node based on the node physical address, each node further comprising at least one processor, at least one memory controller connected to the at least one processor and a plurality of memory devices connected to the at least one memory control.

9 Claims, 7 Drawing Sheets

SYSTEM FOR DISTRIBUTED COMPUTING AND STORAGE

BACKGROUND

The instant disclosure relates to a distributed computing and storage system.

Many computing or storage systems contain host controllers/processors, known as a centralized processing, a switch fabric, and a plurality of memory modules. Within this architecture, commands and data are routed through the switch fabric, which becomes a central-resource bottleneck, especially during high concurrent data access requests.

FIG. 1 highlights one such bottleneck problem with centralized processing, upper layer applications attempt to write and read data to memory module 100, the command and data are routed through host controller/processor 10, the host controller/processor performance limits the concurrency of data reads and writes.

The instant disclosure provides a distributed computing and storage system, with close coupled computing and storage elements, such an architecture may provide more effective data store and processing for some specific applications.

SUMMARY

A distributed computing and storage system is disclosed comprising a plurality of nodes. Each node executes one or more application processes, comprises at least one processor and a plurality of memory devices. Node connections are provided via the switch fabric.

During the system initialization, a provisioning stage is performed, during which nodes generate an internet protocol (IP) address and/or media access control (MAC) address according to a predetermined geographical ID. The geographical ID may be based on a physical location inside a chassis.

DETAILED DESCRIPTION

Figure 1:
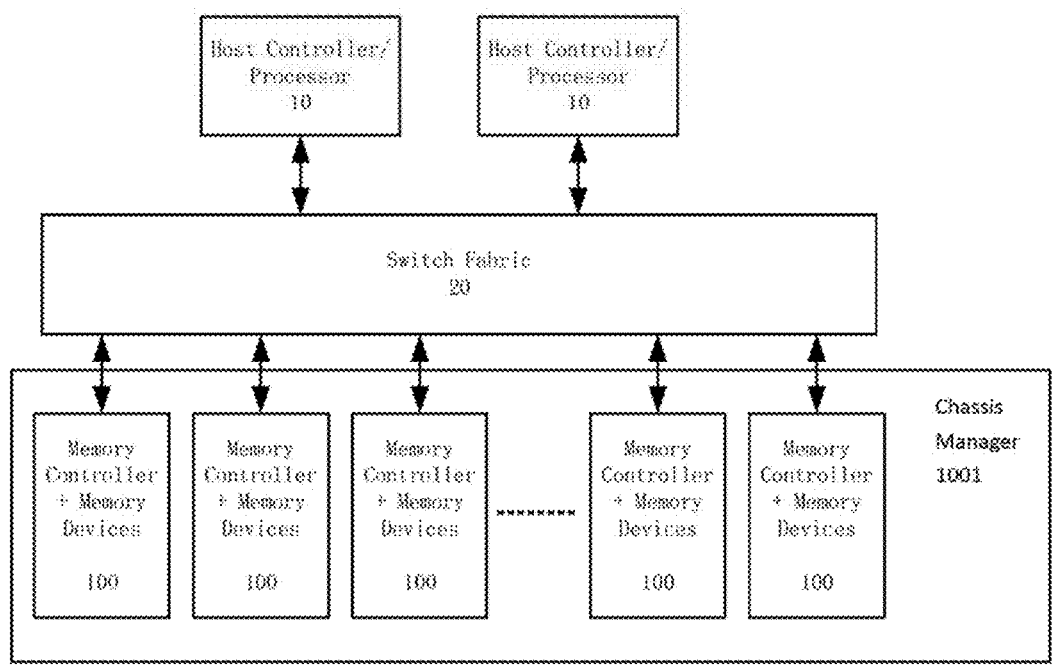
FIG. 1 shows a block diagram of an exemplary legacy storage system.

While the inventions are susceptible to various modifications and alternative forms, specific embodiments are shown by way of examples in the drawings and will be described in detail. It is to be understood, that the figures and detailed description discussed herein are not intended to limit the invention to particular form disclosed, but on the contrary, the intention is to cover all modifications, equivalents and alternatives falling within the spirit and scope of the present invention as defined by the appended claims.

Figure 2:
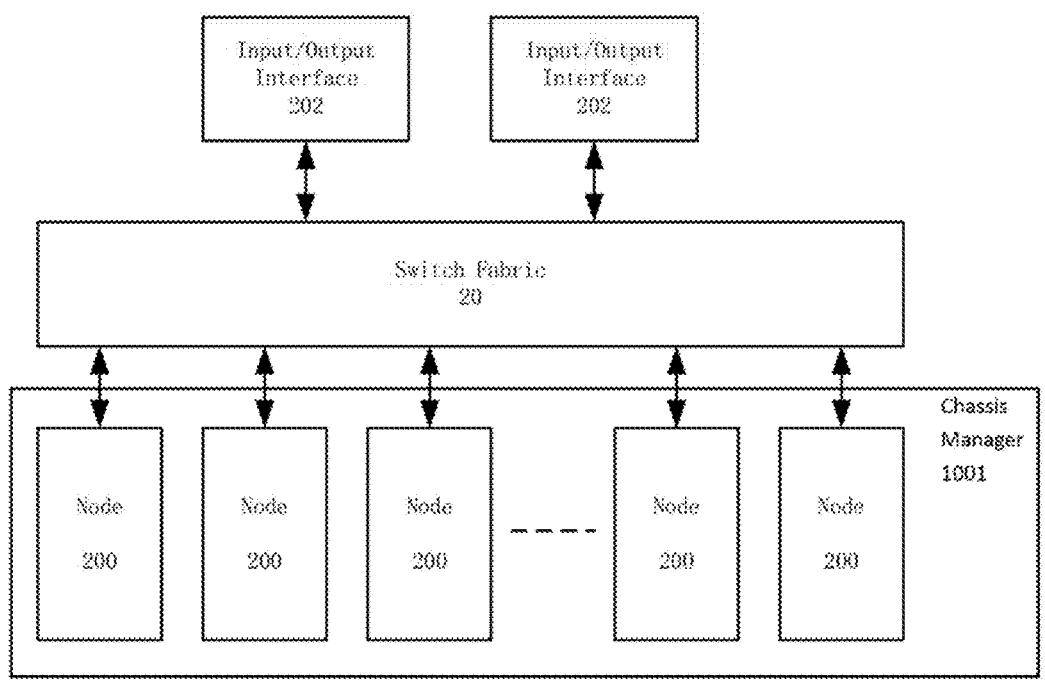
FIG. 2 shows a block diagram of an exemplary distributed computing and storage system, with a plurality of computing and storage nodes, and interconnected through switch fabric.

In FIG. 2, a plurality of nodes (200) may be connected through switch fabric (20). In this example, five nodes are illustrated, although the number of nodes is not critical and is subject to change. Each node comprise at least one processor, and a plurality of memory devices.

In FIG. 2, two input/output interface modules (202) are connected to the switch fabric. In this example, two input/output interface modules are illustrated, although the number of input/output interface modules is not critical and is subject to change. In this example the input/output interface module may be an Ethernet physical layer (PHY) or PHY integrated MAC device.

In FIG. 2, a switch fabric is used to connect the nodes and input/output interface modules. There are different types of switch fabric, including, but not limited to: Ethernet switch, peripheral control interface (PCI)-express switch and Serial RapidIO switch.

In FIG. 2, data from each input/output interface modules, may then be distributed to different nodes and the data may be processed. The architecture of the nodes may be similar to one another, as is shown in FIG. 3.

Figure 3:
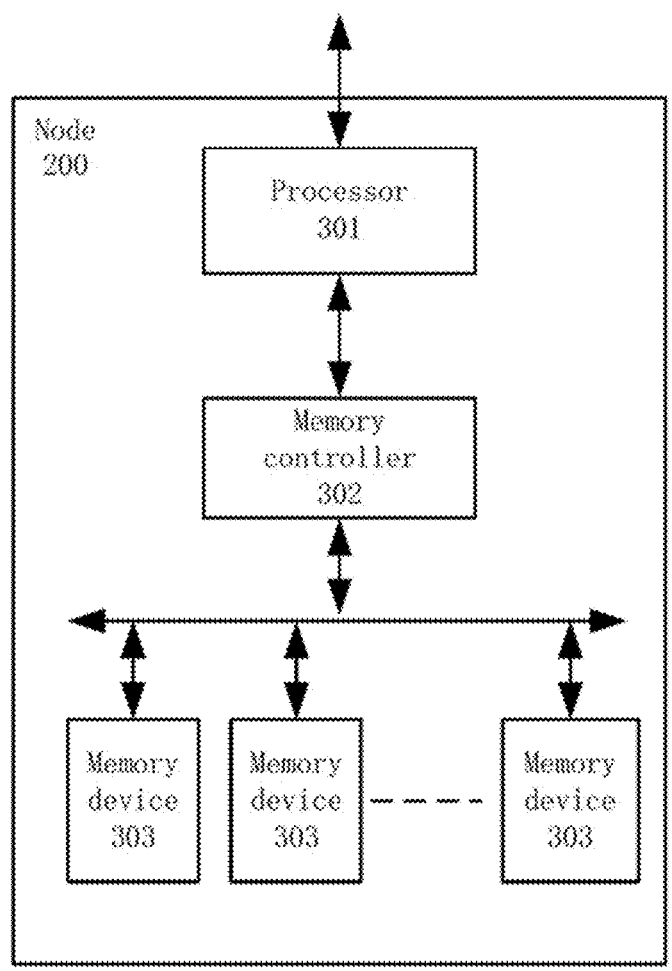
FIG. 3 shows a block diagram of an exemplary node (200).

In FIG. 3, the processor (210) may be a general processor, examples of a suitable general processor, include Intel X86 family, ARM processor family, other suitable general processor will be apparent to those skilled in the art. Alternatively, a system on a chip (SoC), a special purpose application specific integrated circuit (ASIC), or field programmable gate array (FPGA) may be used to support functions as processor.

Figure 4:
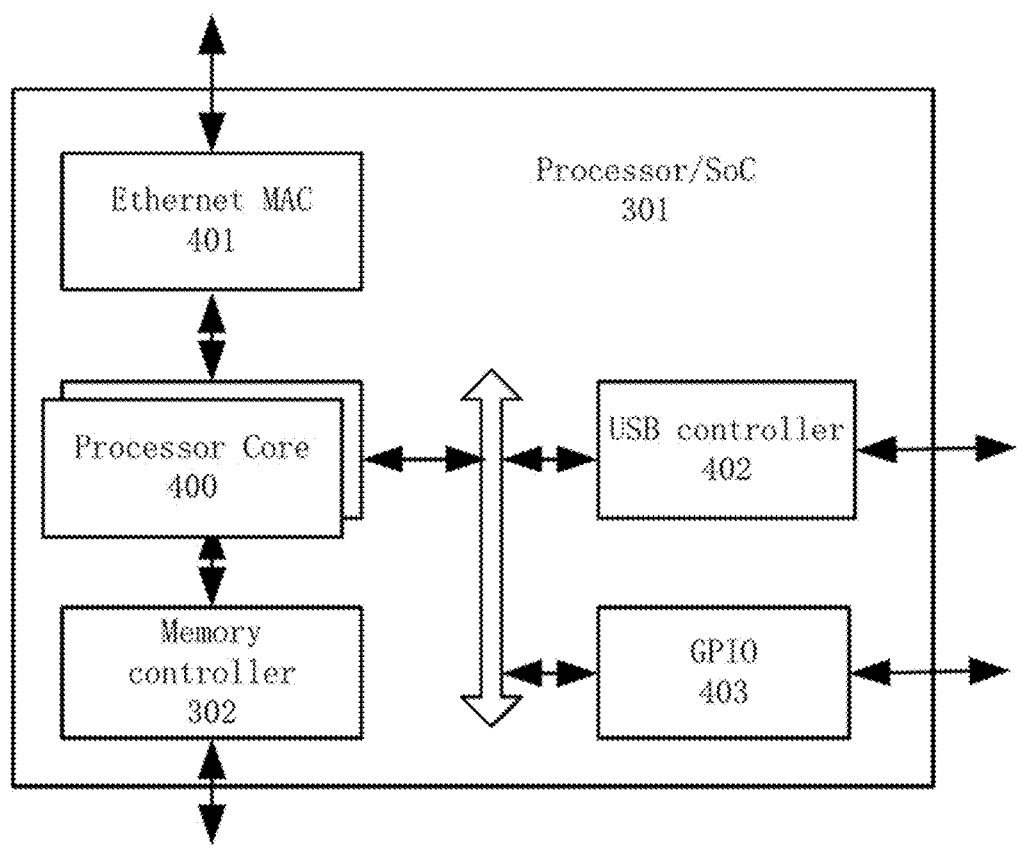
FIG. 4 shows a block diagram of an exemplary processor (301).

In FIG. 3 shows at least one memory controller (211) which may be an individual controller, or it may be part of processor (210), wherein processor (210) may be a SoC or FPGA, shown in FIG. 4.

In FIG. 3, the memory device (212) may be Flash memory, include but not limited to multi-level cell (MLC) NAND Flash, single level cell (SLC) NAND Flash, tri level cell (TLC) NAND Flash, embedded multi-media card (eMMC) memory. Memory device may alternatively be other types of memory, include but not limited to static ram (SRAM), double data rate (DDR) synchronous dynamic random access memory (SDRAM), magnetic random access memory (MRAM), resistive random access memory (RRAM), and 3D XPOINT memory.

In FIG. 4, processor 301 may be a SoC wherein comprising one or multiple processor cores, the type of processor core include but not limited to ARM, X86, MIPS, and other proprietary processor cores. In this example, SoC comprise memory controller (302), Ethernet MAC (401), universal serial bus (USB) controller (402), general purpose input output (GPIO) (403).

Figure 5:
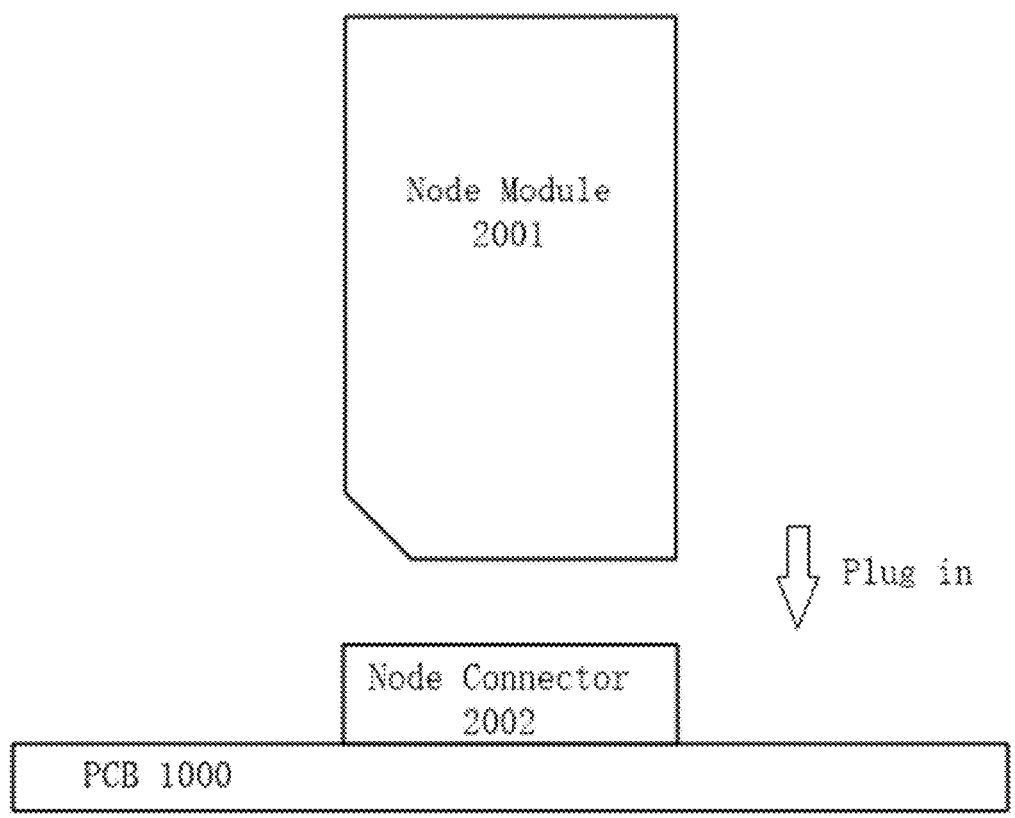
FIG. 5 shows an exemplary physical modules within a node (200).

In FIG. 5, physically, each node comprises a node connector (2002) mounted on a printed circuit board (PCB) (1000), or a platform, and a node module (2001) which may be plugged into the node connector (2002). In FIG. 5, processor (301), memory (302) and memory devices (303) may be located at node module (2001). The node module (2001) is hot swappable.

In FIG. 5, the node connector (2002) is associated with predetermined geographical ID, through hard wired method, or connected to a serial bus, which may include but is not limited to inter-integrated circuit (I2C), etc.

Figure 6:
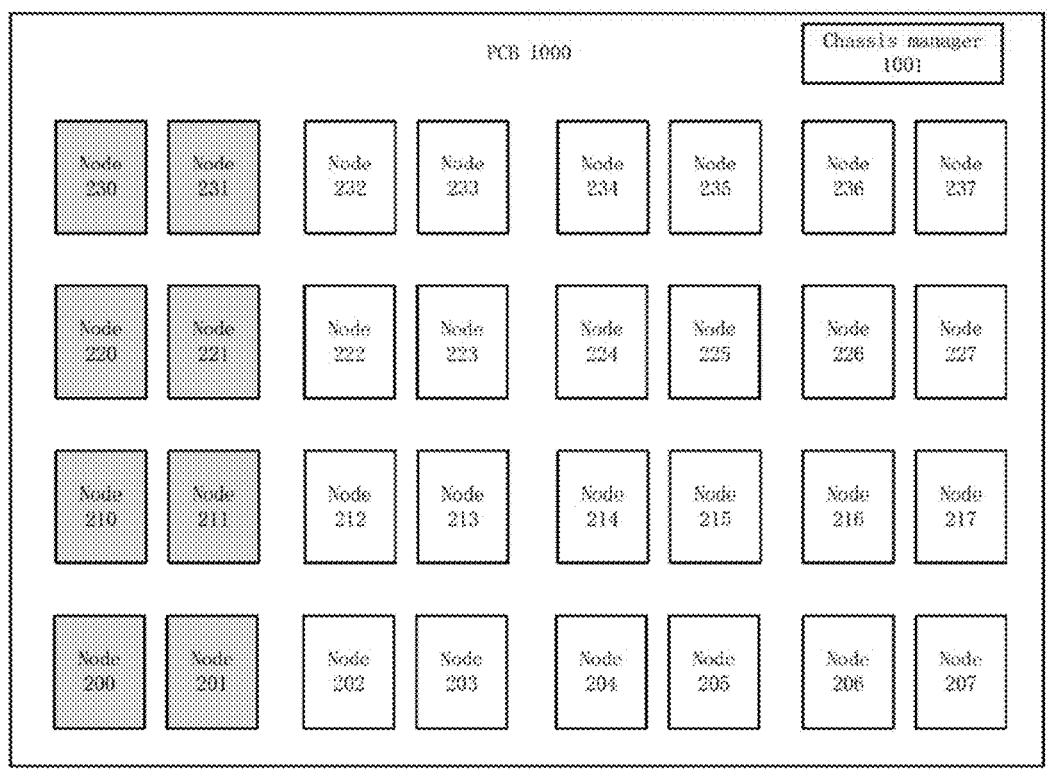
FIG. 6 shows an exemplary node layout on a printed circuit board (PCB) (1000).

In FIG. 6, 32 nodes may be mounted on PCB (1000), 32 nodes are illustrated, although number of nodes is not critical and is subject to change. PCB (1000) may be an individual PCB, or a plurality of small PCB connected by cables or connectors, or maybe some platform which nodes may be mounted on.

In FIG. 6, for each node connector (2002), there may be a unique geographical ID associated with it, and this geographical ID represents a real physical location of each connector.

Figure 7:
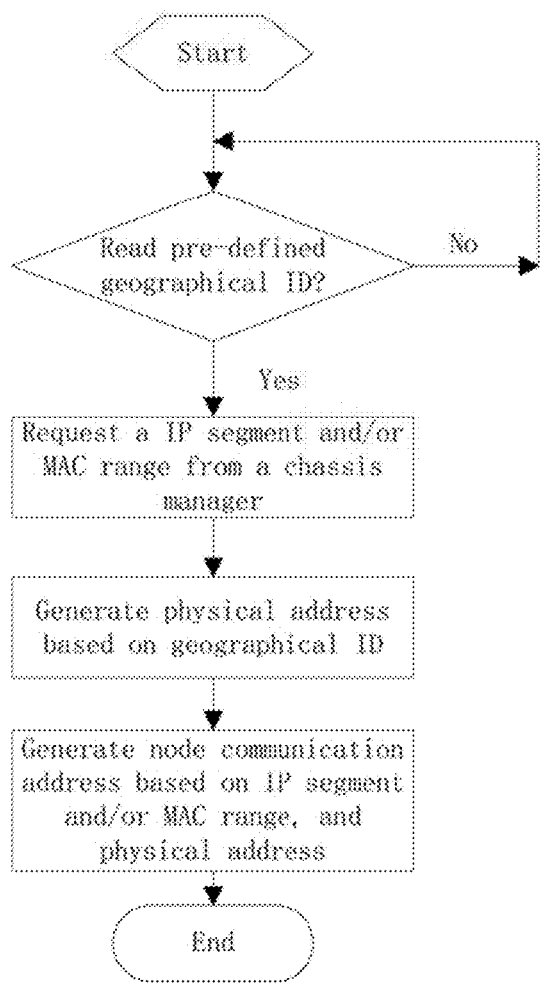
FIG. 7 shows an exemplary flow chart of communication address assignment.

In FIG. 6, during system initialization, a node communication address, which includes but not limited to node communication address based on IP address and/or MAC address, will be generated according to the geographical ID of each node, the procedure is shown in flow chart FIG. 7, wherein chassis manager may be inside the chassis, as shown in FIG. 6, or chassis manager may be outside the chassis as an external device.

In FIG. 6, since the node communication address is linked with a real physical location, in certain deployment cases, some nodes located in a certain area may be active, while the rest may be in idle mode. In this example, node 200, 201, 210, 211, 220, 221, 230, 231 will be in active mode with the other nodes in idle mode.

A distributed computing and storage system, comprising a switch fabric, an input/output interface connected to the switch fabric and a plurality of nodes connected to the switch fabric, each node of the plurality of nodes having a node communication address, which is assigned by the processor inside the node based on the node physical address. Each node further comprising at least one processor, at least one memory controller connected to the at least one processor and a plurality of memory devices connected to the at least one memory controller.

In the distributed computing and storage system the node communication address may comprise an IP segment and/or a MAC range, and the node physical address, wherein the node physical address may be based on a physical location, represented by a geographic ID. The node physical address may also be determined by chassis manager.

A distributed computing and storage system, comprising a switch fabric, an input/output interface connected to the switch fabric and a plurality of virtual nodes connected to the switch fabric, each virtual node of the plurality of virtual nodes having a virtual node communication address which is assigned by the virtual processor inside the node based on the virtual node physical address. Each virtual node further comprising at least one virtual processor, at least one virtual memory controller connected to the at least one virtual processor and a plurality of virtual memory devices connected to the at least one virtual memory controller.

In the distributed computing and storage system the virtual node communication may comprise an IP segment, and the virtual node physical address, wherein the node physical address may be based on a physical location, represented by a geographic ID. The virtual node physical may also be determined by chassis manager.

Although the invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the inventions.

What is claimed is:

1. A distributed computing and storage system, comprising:
   a switch fabric;
   an input/output interface connected to the switch fabric;
   a plurality of nodes connected to the switch fabric;
   a chassis manager, which determines an IP segment and/or a MAC range of each node of said plurality of nodes; and
   each node further comprising:
      at least one processor;
      at least one memory controller connected to the at least one processor;
      a plurality of memory devices connected to the at least one memory controller;
      a node physical address based on a physical location, represented by a geographic ID; and
      a static and unique node communication address assigned by said at least one processor and calculated using said IP segment and/or MAC range, and said node physical address.

2. The distributed computing and storage system of claim 1 wherein the chassis manager initiates IP assignment packets to each individual node.

3. The distributed computing and storage system of claim 2 wherein the processor is a generic processor using Intel X86, ARM, MIPS, or POWER Architecture.

4. The distributed computing and storage system of claim 1 wherein a unique physical location can be read through serial bus like I2C bus.

5. A distributed computing and storage system, comprising:
   a switch fabric;
   an input/output interface connected to the switch fabric;
   a plurality of virtual nodes connected to the switch fabric,
   a chassis manager, which determines an IP segment and/or a MAC range of each virtual node of said plurality of virtual nodes; and
   each virtual node further comprising:
      at least one virtual processor;
      at least one virtual memory controller connected to the at least one virtual processor;
      a plurality of virtual memory devices connected to the at least one virtual memory controller;
      a virtual node physical address based on a node physical location, represented by a geographic ID: and
      a static and unique virtual node communication address assigned by said at least one virtual processor and calculated using said IP segment and/or MAC range, and the virtual node physical address.

6. The distributed computing and storage system of claim 5 wherein the processor is a generic processor using Intel X86, ARM, MIPS, or POWER Architecture.

7. The distributed computing and storage system of claim 5 wherein the chassis manager initiates IP assignment packets to each individual node.

8. The distributed computing and storage system of claim 5 wherein the processor inside the virtual node generates the virtual node communication address based on node physical address of each node during system initialization.

9. The distributed computing and storage system of claim 5 wherein a unique physical location can be read through serial bus like I2C bus.

* * * * *